United States Patent [19]

Terragnoli

[11] Patent Number: 4,677,888
[45] Date of Patent: Jul. 7, 1987

[54] SELF-CONTAINED MACHINE FOR SIMULTANEOUSLY SLICING AND PERFORATING MUFFINS PRIOR TO PACKAGING

[76] Inventor: John Terragnoli, 103 Wallace Ave., Buffalo, N.Y. 14214

[21] Appl. No.: 877,375

[22] Filed: Jun. 23, 1986

[51] Int. Cl.[4] .................. A21C 15/04; B26D 3/08; B26D 3/30; B26F 3/02
[52] U.S. Cl. .................................. 83/862; 83/866; 83/870; 83/886; 225/94; 225/97
[58] Field of Search ............... 83/866, 867, 871, 872, 83/879, 868, 862, 861, 870; 225/97, 94

[56] References Cited

U.S. PATENT DOCUMENTS

| | | | |
|---|---|---|---|
| 1,766,450 | 6/1930 | Ost | 83/872 |
| 2,235,546 | 3/1941 | Ahrndt | 83/872 |
| 2,520,000 | 8/1950 | Dettman | 83/879 |
| 2,686,542 | 8/1954 | Schmidt | 83/872 |
| 2,783,803 | 3/1957 | Weckel et al. | 83/867 |
| 2,979,095 | 4/1961 | Jovis | 225/94 |
| 3,192,976 | 7/1965 | Clock | 83/871 |
| 3,733,942 | 5/1973 | Noel | 83/868 |
| 3,737,084 | 6/1973 | Noel | 83/868 X |
| 4,015,492 | 4/1977 | Terragnoli | 83/866 |
| 4,220,065 | 9/1980 | Stanford | 83/873 |
| 4,237,763 | 12/1980 | Chipchase | 83/872 |
| 4,287,801 | 9/1981 | Hanson | 83/871 |

Primary Examiner—Donald R. Schran
Attorney, Agent, or Firm—James J. Ralabate

[57] ABSTRACT

A self-contained machine for simultaneously slicing and perforating severally the baked goods, such as English muffins, bagels, buns, rolls or the like, in two rows; the machine including a framework on which are mounted but a single motor, a split belt conveyor, a slicing station and a perforating station, and drive mechanisms severally operatively connecting the motor with the conveyor, slicing station and perforating station, the slicing station including a horizontal serrated wheel and guide cooperating with one of the split belts and each other for proper slicing of the baked goods in one row, and the perforating station including a cleated belt arranged on edge, a perforating member and a guide cooperating with the other split belt and each other, for proper perforating of the baked goods in the other row.

9 Claims, 5 Drawing Figures

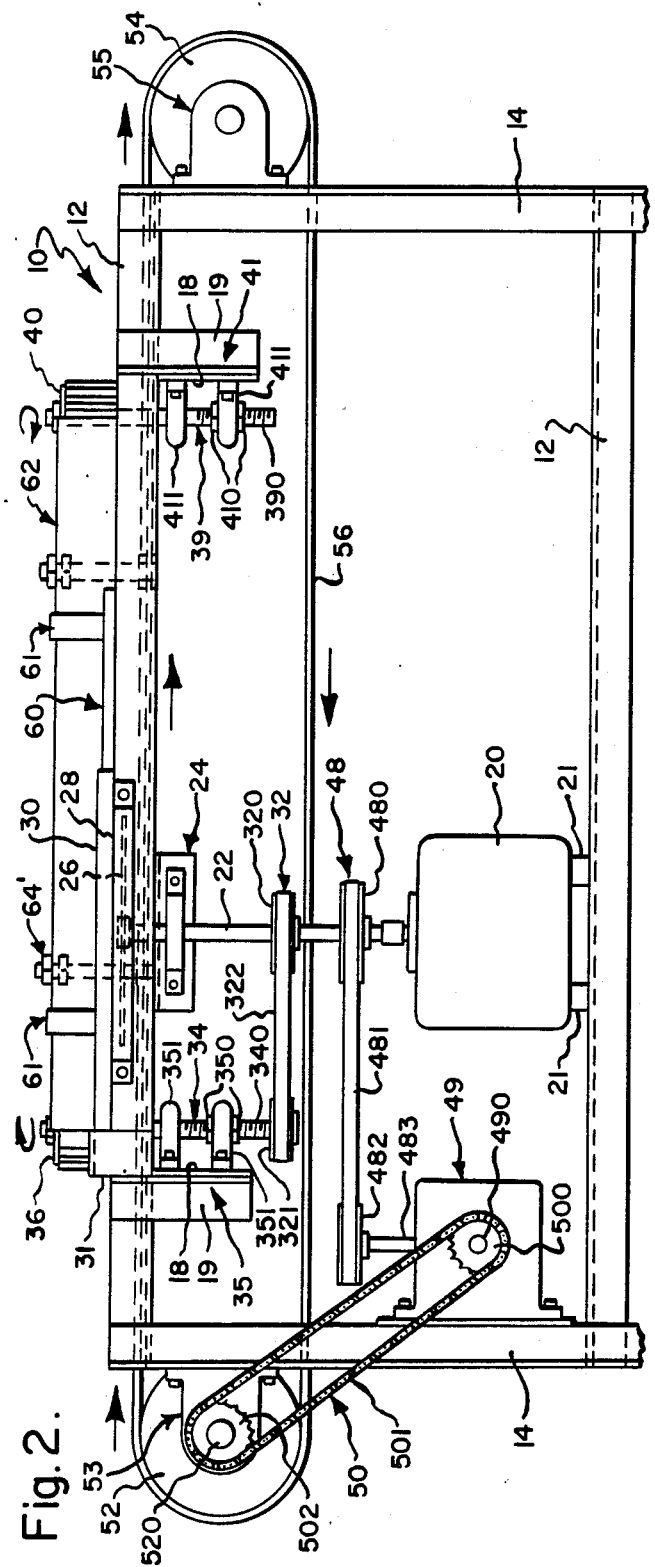
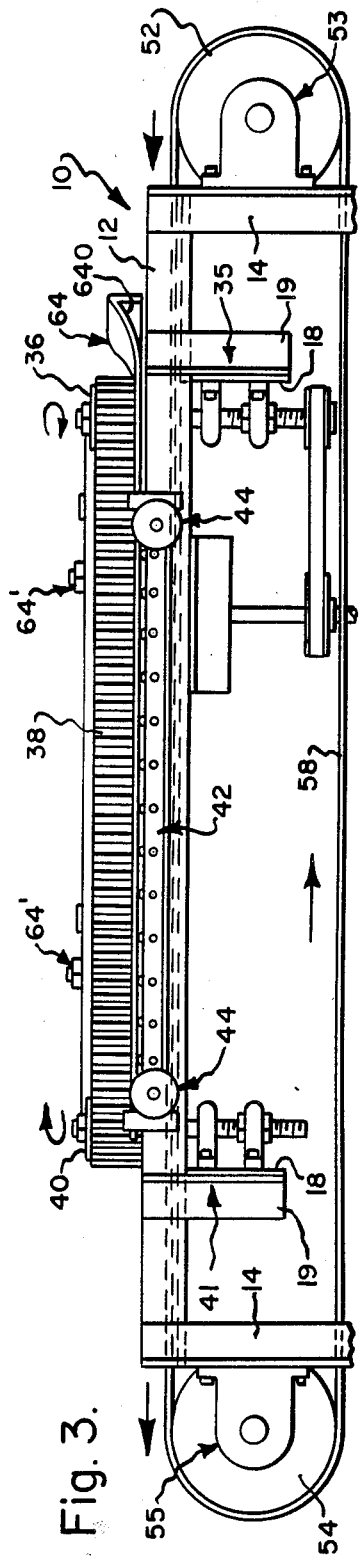
Fig. 2.
Fig. 3.

SELF-CONTAINED MACHINE FOR SIMULTANEOUSLY SLICING AND PERFORATING MUFFINS PRIOR TO PACKAGING

BACKGROUND OF THE INVENTION

1. Field of the Invention

This invention relates to production machines for slicing and/or perforating of baked goods such as English muffins, bagels, buns, rolls or the like in a controlled manner, and more particularly to a new and improved self-contained machine for simultaneously slicing and perforating of baked goods, such as English muffins, bagels, buns, rolls or the like.

2. Description of the Prior Art

It long has been recognized that consumers generally prefer pre-sliced and/or perforated English muffins, bagels, buns, rolls or similar baked goods, because slicing by hand causes an inconvenience to the consumer, and very often uneven slices are made, particularly when toasting the sliced baked goods, the goods either will not fit into a conventional toaster aperture or the product may be charred in one part and underdone in another. Machines for pre-slicing or perforating muffins and similar bakery products are described in the prior art, but they are usually complex in structure and often pre-slice or perforate the bakery product in an unsatisfactory manner.

Basically, such prior art devices are divided into two groups, the first group being muffin slicing machines, the second group being muffin perforating machines.

Examples of the slicing machines are as follows:

Ost, U.S. Pat. No. 1,766,450, issued 6/24/30, discloses a muffin cutting machine, which is self-contained, and does utilize a single drive motor for partially or completely slicing muffins, with a straight line passthrough. However there is no provision for perforating the muffins (as opposed to slicing the same), and the patented cutting wheel is located in a vertical plane, as opposed to a horizontal plane.

Ahrndt, U.S. Pat. No. 2,235,546, issued March 18, 1941, discloses a muffin slicing machine wherein the muffins are sliced as they slide down an inclined shute into which the cutting wheel projects. This patent does not disclose a conveyor, it being necessary to push the muffins down by hand, and clearly there is no suggestion of any simultaneous slicing and perforating operations either.

Dettman, U.S. Pat. No. 2,520,000, issued 8/22/50, merely discloses a hot dog slicer wherein the sliding knife protruding down through the slot in the inverted channel frame slices the frankfurter held within such frame.

Schmidt, U.S. Pat. No. 2,686,542, issued Aug. 17, 1954, discloses a machine for simultaneously partially slicing adjacent rows of rolls spread apart by a cutter wheel guide. Once again, there is no provision for perforating such buns or rolls.

Jovis, U.S. Pat. No. 2,979,095, issued Apr. 11, 1961 also shows a fully automatic muffin splitting machine which likewise delivers a separated muffin to the consumer.

Swedish Pat. No. 145,284 (1961) discloses a rusk roll slicing device that splits the roll into two separate and distinct pieces and then separates the top half of the roll from the bottom half to complete the split, for delivery of both halves as separate units to the consumer.

Tobey, U.S. Pat. No. 3,669,175, issued 6/13/72, describes a machine for making pre-sliced English muffins wherein the muffin is pre-sliced by means of a plurality of series arranged rotating cutter disks so that the slicing of the muffin is made in a series of successive cuts, this device being complicated in structure and expensive to manufacture and, because the muffins must pass through a series of rotating blades, often resulting in uneven slices.

Chipchase, U.S. Pat. No. 4,237,763, issued 12/9/80, relates to a rather complex muffin slicing or scoring machine having oppositely driven belts for rotating the muffins as the same are fed to a cutting wheel. There is no disclosure of slicing and perforating muffins, the split belts are located on the same edge of the muffin, which could possibly cause skewing thereof during travel, and separate and complicated takeup devices are necessary for such split belts.

The second group of patents, is directed to perforating machines, as follows:

Weckel, U.S. Pat. No. 2,783,803, issued 3/5/57, merely discloses a cranberry puncturing machine, wherein radially outwardly projecting tines are located on a rotating cylinder. This patented device is otherwise not pertinent.

Clock, U.S. Pat. No. 3,192,976, issued 7/6/65, is directed to a muffin perforating apparatus employing chain driven tines, somewhat similar to Hanson, below, but the Clock tines converge along an arcuate, rather than a diamond shape path, as in Hanson, below.

Noel, U.S. Pat. No. 3,733,942, issued 5/22/73, relates to a muffin perforating machine but does not provide for pre-slicing of muffins or similar baked goods. In this patent, the tines are reciprocated transversely of the muffins while traveling along the muffin conveyor.

Noel, U.S. Pat. No. 3,737,084, issued 6/5/73, also discloses a muffin perforating machine, wherein the tines are reciprocated transversely of the muffins, as in the patent just mentioned above, but this patented device also splits the perforated muffins by elevating one of the two transversely movable tine sections. Even so, this patent is no more pertinent than the first mentioned Noel patent.

Hanson, U.S. Pat. No. 4,287,801, issued 9/8/81, discloses a somewhat complex muffin perforating machine wherein the chain driven blades or tines travel along an elongated diamond shaped path, while at the same time being oscillated transversely of such path for penetration into and removal from the belt driven muffins. Clearly, there is no suggestion of simultaneously slicing a separate row of muffins.

There is, then, an obvious need in the marketplace for a production muffin slicer and perforater that is not only economical to manufacture, but also will produce a uniformly pre-sliced or perforated muffin for use by the consumer. This need has, until now, been fulfilled by the inventor's prior U.S. Pat. No. 4,015,492, issued 4/5/77, wherein the patented device is useful in production operations for slicing or perforating muffins in an even and uniform manner, to provide a uniform top and bottom section thereof, but without separating the top from the bottom of the muffin. The patented device is capable of both slicing and perforating; it is easy to use and reliable and efficient in operation; it also is of a rugged and durable construction, and which, therefore may be quaranteed by the manufacturer to withstand rough and continual usage. In addition, it is simple in construction, and therefore may be economically produced by the manufacturer.

At the same time, the patented device does have limitations. The slicing and perforating operations only can be performed alternately, *not* simultaneously. More than one drive motor is required to operate the machine; the muffins follow a sequential straight line, arcuate path and then straight line passthrough, increasing the likelihood of jamming, and the patented machine is *not* self-contained, but rather designed to be mounted over an existing bakery conveyor belt.

DEFINITION

For the purpose of employing clear, coherent, comprehensive, concise and consistent terminology herein, the term(s) "muffin(s)", as hereinafter used is (are) intended to include English muffin(s), bagel(s), bun(s), roll(s) and the like baked good(s) or bakery product(s) having generally round or circular configuration(s), at least one and preferably two generally flat side(s), and the capability of being rolled on edge(s).

SUMMARY OF THE INVENTION

Accordingly, a general primary objective of the present invention is to provide a new and improved, self-contained machine for simultaneously slicing and perforating baked goods, such as muffins, prior to packaging the same, and which machine is so constructed and designed so as to overcome the various deficiencies in the aforesaid prior art. To this end, the present invention is embodied in a self-contained machine for slicing and perforating baked goods, such as muffins, the machine including frame means, motor means, baked goods conveying means, slicing means and perforating means mounted on the frame means and, drive means operatively connecting the motor means with the conveying means, slicing means and perforating means wherein the improvement comprises: the slicing means and perforating means including guide means cooperating with said conveyor means, slicing means and perforating means, for simultaneously slicing and perforating the baked goods.

Specific primary objectives of the present invention are to provide such new and improved machine, which is so constructed and designed as to provide for but a single drive motor for the entire apparatus; straight line passthrough of the muffins for both slicing and perforating operations, in order to avoid jamming, and to provide a self-contained machine incorporating its own conveyor.

More specific primary objectives of the present invention are to provide such new and improved machine, which is so constructed and designed as to be not only easy to use but also reliable and efficient in operation; which is of a rugged and durable construction and therefore may be guaranteed by the manufacturer to withstand rough and continuous usage; and which is relatively simple in construction and therefore may be economically produced by the manufacturer.

Additional objectives and advantages of the invention will become apparent upon consideration of the following detailed description and the accompanying drawings, wherein:

BRIEF DESCRIPTION OF THE DRAWINGS

FIG. 2 is a right side elevational view taken substantially along line 2—2 of FIG. 1, and illustrating details of the muffin conveying, slicing, perforating and drive motor systems or mechanisms;

FIG. 3 is a fragmentary left side elevational view, taken substantially along line 3—3 of FIG. 1, and illustrating additional details of the muffin conveying, perforating and drive motor systems or mechanisms;

FIG. 4 is a right end view taken substantially along the line 4—4 of FIG. 1, and illustrating the entrance end construction of the inventive embodiment, and FIG. 5 is a section taken generally along line 5—5 of FIG. 1, and illustrating details of not only the muffin conveyor mechanism and drive mechanism for actuating the serrated disc for slicing one row of muffins, but also the muffin conveyor mechanism, cleated belt muffin drive mechanism and blade device for simultaneously perforating another row of muffins.

DESCRIPTION OF THE PREFERRED EMBODIMENT

Figure 1:
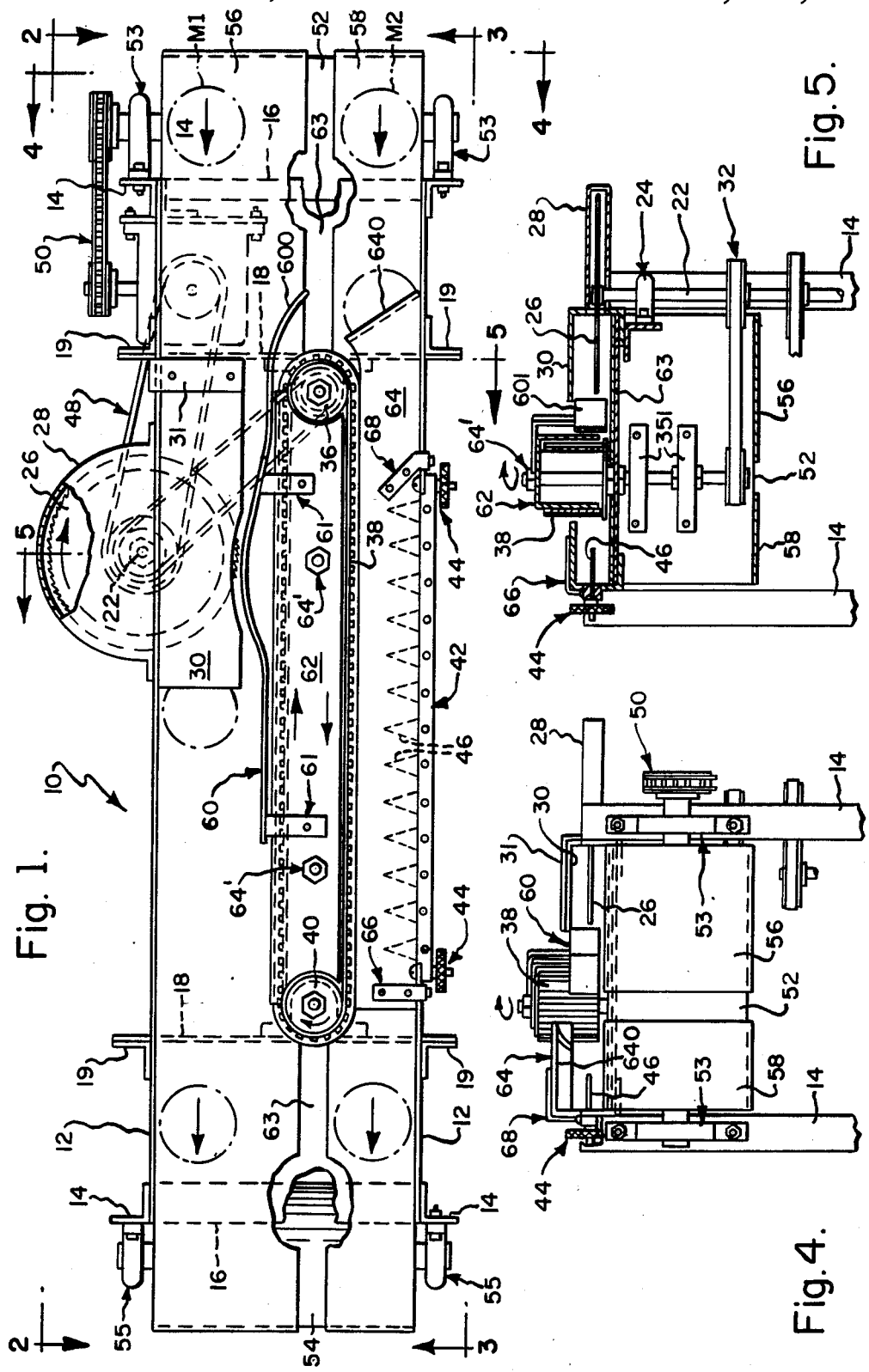
FIG. 1 is a top plan view with portions broken away in sections, and shows a self-contained machine for simultaneously slicing and perforating muffins, and constituting a preferred embodiment of the invention; this view illustrating the framework and the muffin conveyor systems mounted thereon, as well as the simultaneous straight line passthroughs of the two rows of muffins, for both perforating and slicing purposes.

Referring to the drawings, and particularly FIGS. 1-3, the inventive machine is supported by an elongated, open box-like framework 10 including elongated upper and lower, horizontal side members 12 connected at and/or adjacent their ends by vertical side members 14, as well as by horizontal cross members 16. Such framework also includes intermediate horizontal cross members 18 spanning upper members 12 and supported by vertical members 19 depending from members 12 for supporting components described below. This frame may be assembled in any suitable manner, such as by welding, and the various frame members preferably are of angle iron construction, unless otherwise shown.

A single drive motor 20 is suitably mounted on one or more lower frame members 12, as at 21, and is provided with an elongated, upstanding drive shaft 22 suitably journaled, as at 24, and driving horizontal serrated slicing wheel 26, the outer or outboard half of which is covered by guard 28 suitably removably mounted on upper frame member 12, and the inner or inboard half of which is likewise covered by an enlarged and horizontally elongated, stainless steel muffin guide 30 of generally L-shaped cross-section, and also suitably removably mounted on the framework contiguous to guard 28, by bracket assembly 31 (FIGS. 4 and 5).

Drive belt assembly 32 on shaft 22, as best seen in FIG. 2, drives vertical driven shaft 34 which is suitably journaled by mounting assembly 35 including adjacent cross member 18 and vertical member 19 of the frame, and is provided at its upper end with a drive sheave 36 on which is mounted a continuous cleated muffin propelling belt 38, the other end of which is mounted over a driven sheave 40 having depending shaft 39 suitably journaled on upper longitudinal member 12 by mounting bracket assembly 41, which likewise includes another adjacent cross member 18 and vertical member 19 of the frame.

As best seen in FIG. 1, the outer reach of the belt faces and is spaced from elongated and longitudinally extending perforating member 42 removably mounted on upper frame member 12, by quick release wheel mechanisms 44, and such perforating member is provided with a series of longitudinally spaced and horizontally inwardly extending, removable pointed blades or tines 46 for perforating muffins between the belt cleats and blades.

Referring back to FIG. 2, for vertical adjustment purposes shafts 34 and 39 may be externally threaded, as at 340 and 390 respectively, and both brackets 35 and 41 may be provided with lock nuts 350 and 410 above and below the lower of the dual journals 351 and 411 respectively. In addition, belt drive assembly 32 preferably is composed of drive pulley or sheave 320 fast on shaft 22 and driven pulley 321 fast on shaft 34 and connected by endless belt 322.

The various drive mechanisms are completed by combined belt and chain drive assemblies 48, 50 driving an enlarged and horizontal transverse belt hub, sheave or drum 52 suitably journaled at the inlet end of the machine (shown at the left in FIG. 2, and at the right in FIGS. 1 and 3), by mounting assemblies 53 and connected to driven belt hub, sheave or drum 54 which is suitably journaled by mounting assemblies 55 at the outlet end of the machine, by split muffin conveyor belts 56, 58 (in order to provide spacing for shafts 34 and 39 supporting cleated belt sheaves 36, 40 respectively).

As shown in FIG. 2, belt drive assembly 48 preferably includes drive sheave 480 on shaft 22, endless belt 481 connected to driven sheave 482 fast on shaft 483, which constitutes the input to a gear ratio varying, preferably gear reduction, mechanism or box 49 suitably mounted on adjacent frame member 14 and having an output shaft 490 driving cog wheel 500 of chain drive assembly 50, which also preferably includes endless chain 501 driving cog wheel 502 fast on shaft 520 spanning adjacent journals 53.

Thus, this dual or split belt muffin drive mechanism also is taken off the output of single drive motor 20, along with the direct shaft drive 22 for serrated, muffin slicing wheel 26, and drive mechanism 32 for cleated muffin propelling or conveying belt 38; as well as combined belt, gear box and chain drive mechanisms 48, 49, 50 for both split belts 56, 58. The former automatically feeds one row of muffins M1 to and from the slicing wheel station, and the latter automatically feeds another row of muffins M2 to and from the perforating station. Accordingly, there is needed but one drive motor for all the movable conveyor, slicing and perforating mechanisms or systems.

The essential structure also includes an adjustable inner resilient, flexible guide 60 suitably mounted by bracket assemblies 61 on an L-shaped cover or frame 62 covering the top and inside reach of cleated muffin propelling belt 38, and in turn, suitably mounted on underlying split belt supporting platform 63 spanning top horizontal frame members 12 and extending longitudinally from transverse member 16 adjacent the inlet end to transverse outlet end member 16, by upstanding nut and bolt type mounting devices 64 extending through cover 62 and platform 63. Such adjustable guide 60 has a reversely curved undulating entrance portion 600 opening upstream of wheel 26, and gradually tapering or narrowing laterally outwardly toward the wheel, in order to resiliently urge the row of muffins M1 to be sliced into the desired contact with the serrated wheel, for slicing the same beneath guard and/or guide 30, as such muffins are transported or conveyed substantially flat and horizontally in a single straight line or path to the slicing station. As will be evident, the clockwise (FIG. 1) rotation of wheel 26 at a speed greater than that of belt 56 and the increasing friction between the tapering muffin edge engaging surface 601 (FIG. 5) of the entrance portion 600 of guide 60 causes counter-clockwise rolling of muffins M1 into proper slicing engagement with and past wheel 26. Of course, the shape of this inner guide and/or guard 60 can be adjusted to vary the depth of slice, as desired, although normally a small central, unsliced portion of each muffin M1 is left to facilitate handling and packaging.

As for the row of muffins to be perforated, M2, they also are transported flat and straight on horizontal split belt 58 from right to left (FIG. 1) and beneath guard and/or guide 64, and once engaged by the outer reach of the clockwise moving lugged or cleated belt 38, these muffins are rolled on edge, counter-clockwise, into proper perforating or piercing engagement with and past knife blades or tines 46, whereupon the perforated muffins M2 also are transported to the exit end of the inventive machine for further processing, including packaging. While the perforating operation could be so complete as to entirely separate the muffin halves, it is preferred that the same remain connected together for ease of handling and packaging.

For varying the depth of perforation, the lateral spacing between blades 46 and the outer reach of belt 38, readily could be adjusted, such as by adjustably mounting piercing or perforating member 42 and/or the drive mechanism for belt 38 for relative lateral movement toward and away from each other. Likewise, for varying the spacing between perforations, various types of members 42 having various members of and spacings between blades could be employed, as facilitated by the well known quick release wheel mounting mechanisms 44.

As best seen in FIGS. 1, 3 and 4, guard and/or guide 64 is provided with an enlarged entrance 640 which is upstream of and inclined inwardly toward cleated belt 38, and which also tapers laterally outwardly and downwardly, thereby acting as a stabilizer baffle, in order to press the muffins down against belt 58 and compress the same between cleated belt 38 and against blades 46 of perforating member 42, with belt 38 travelling at a greater speed than belt 58, in order to roll the muffins M2 edgewise into proper piercing or perforating engagement with blades 46. Likewise, it will be noted that guide 64 is suitably mounted on upper longitudinal frame member by suitable bracket assemblies 66, 68 below the upper edge of belt 38 but above blades 46 for the proper rolling and perforating actions.

From the foregoing detailed description and accompanying drawings, it will be seen how the invention accomplishes its various objectives, namely the simultaneous slicing and perforating operations, a simplified single drive motor for all driven components, a more direct, straight line passthrough(s) for both the muffins to be perforated and the muffins to be sliced, as opposed to sequential straight line, arcuate and then straight line passthrough(s), thereby reducing the likelihood of jamming, and the making of the present automatic machine self-contained by providing its own conveyor belt, instead of being designed to be mounted over an existing bakery conveyor belt, with attendant installation and fit problems.

Likewise, additional objects and advantages of the invention will become apparent from the foregoing. While the invention has been described and illustrated herein by reference to a single preferred embodiment, it is to be understood that various changes may be made therein by those skilled in the art without departing from the spirit of the invention, the scope of which is to be determined by the appended claims.

What is claimed is:

1. A self-contained machine for slicing and perforating baked goods, such as muffins, said machine including frame means, motor means, baked goods conveying means, slicing means and perforating means mounted on said frame means, and drive means operatively connecting said motor means with said conveying means, slicing means and perforating means, wherein the improvement comprises; said slicing and perforating means including guide means cooperating with said conveying means, slicing means and perforating means, for simultaneously slicing and perforating said baked goods, said motor means comprising but a single motor operatively connected to said conveying means, slicing means and perforating means by said drive means.

2. The machine of claim 1, wherein said drive means include separate drive systems severally operatively connecting said motor means with said conveying means, slicing means and perforating means.

3. The machine of claim 1, wherein said conveying means include split belts spaced to provide clearance for mounting said perforating means on said frame means; said split belts being adapted to severally convey two rows of baked goods in substantially flat, straight line paths to said slicing and perforating means, for simultaneous slicing and perforating of said baked goods, as well as conveying said baked goods from said slicing and perforating means to an exit end of said machine for packaging said baked goods.

4. The machine of claim 1, wherein said slicing means include a generally horizontally arranged rotatable serrated wheel operatively connected to said motor means, and a laterally outwardly and forwardly tapering, resilient guide cooperating with said slicing wheel and conveying means for slicing said baked goods.

5. The machine of anyone of claims 1, 3, and 4 wherein said slicing means moves in generally the same direction but at a faster speed than said conveying means for rolling said baked goods on edge along said guide means of said slicing means, for proper slicing of said baked goods.

6. The machine of claim 1, wherein said perforating means include an endless cleated belt arranged on edge above said conveying means and operatively connected to said motor means, an elongated perforating member mounted on said frame means to extend along and in laterally outwardly spaced relation to the outer reach of said belt, and wherein said guide means includes a laterally outwardly, forwardly and downwardly tapering guide cooperating with said conveyor means, cleated belt and perforating means, for rolling said baked goods on edge along said perforating means between said belt and perforating member, for proper perforating of said baked goods.

7. The machine of claim 6, wherein said perforating member is removably mounted on said frame means and includes a longitudinally spaced series of laterally inwardly tapering blades spaced from the outer reach of said cleated belt for proper perforating of said baked goods as they roll along and are pierced by said blades.

8. The machine of anyone of claims 1, 3, 6 and 7 wherein said perforating means cooperates with said conveying means for rolling said baked goods on edge along said perforating means for proper perforating of said baked goods.

9. The machine of anyone of claims 1, 3, 4, 6 and 7 wherein said slicing means includes an outer protective guard mounted on said frame means and the outer portion of said slicing means and an enlarged inner protective guard mounted on said frame means and covering the inner portion of said slicing means and baked goods to be sliced, and said perforating means include a protective cover mounted on said frame and covering said perforating means, and a combined guide and guard mounted on said frame means and spaced above said conveying means and covering said baked goods to be perforated, all for ensuring proper slicing and perforating of said baked goods in a safe manner.

* * * * *